Dec. 13, 1966  R. C. RAU  3,290,860
STACKING AND WRAPPING MACHINE
Filed Dec. 7, 1962  7 Sheets-Sheet 1

INVENTOR.
Richard C. Rau
BY
Ezekiel Wolf, Wolf & Greenfield
ATTORNEYS

Dec. 13, 1966  R. C. RAU  3,290,860
STACKING AND WRAPPING MACHINE
Filed Dec. 7, 1962  7 Sheets-Sheet 2

INVENTOR.
Richard C. Rau
BY
Ezekiel Wolf, Wolf & Greenfield
ATTORNEYS

Dec. 13, 1966 R. C. RAU 3,290,860
STACKING AND WRAPPING MACHINE
Filed Dec. 7, 1962 7 Sheets-Sheet 3

INVENTOR.
Richard C. Rau
BY
Ezekiel Wolf, Wolf + Greenfield
ATTORNEYS

Dec. 13, 1966   R. C. RAU   3,290,860
STACKING AND WRAPPING MACHINE
Filed Dec. 7, 1962   7 Sheets-Sheet 6

INVENTOR.
Richard C Rau
BY
Ezekiel Wolf, Wolf, Greenfield
ATTORNEYS

Dec. 13, 1966   R. C. RAU   3,290,860
STACKING AND WRAPPING MACHINE
Filed Dec. 7, 1962   7 Sheets-Sheet 7

INVENTOR.
Richard C. Rau
BY
Ezekiel Wolf, Wolf & Greenfield
ATTORNEYS

United States Patent Office 3,290,860
Patented Dec. 13, 1966

3,290,860
STACKING AND WRAPPING MACHINE
Richard C. Rau, Mendon, Mass., assignor to Electronic Coin Processing Corp., New York, N.Y., a corporation of New York
Filed Dec. 7, 1962, Ser. No. 243,111
9 Claims. (Cl. 53—184)

This invention relates to coin handling equipment and more particularly comprises a new and improved assembly for feeding, stacking and wrapping coins.

Typically the apparatus of this invention may be used to receive coins in bulk and automatically wrap them in a package of the type disclosed in my copending application Serial No. 150,217 filed November 26, 1961, now abandoned. In addition, many of the subassemblies may be used for other purposes to feed and/or stack coins for other types of coin handling equipment.

The recent growth of self-service markets and vending machine operations have created an increased demand for packaged coins in assorted denominations. Such facilities have also created a need for equipment for receiving coins in bulk and capable of feeding the coins rapidly to coin stacking equipment. The persent invention is intended to fulfill these growing needs.

One important object of this invention is to provide coin handling equipment capable of receiving coins in bulk and converting the coins in bulk to stacks of preselected numbers.

Another important object of this invention is to provide machines capable of receiving coins in bulk and automatically stacking and wrapping the coins to provide a package having a plurality of rolls of coins of the same or different denominations.

Another important object of this invention is to provide means for inexpensively and automatically wrapping stacked coins fed to it.

These and other objects of this invention, along with the apparatus for achieving them, will be fully understood from the following detailed description of several embodiments and combinations, read in connection with the accompanying drawing, in which.

In the following description each of the different assemblies are described under appropriate headings.

Figure 1:
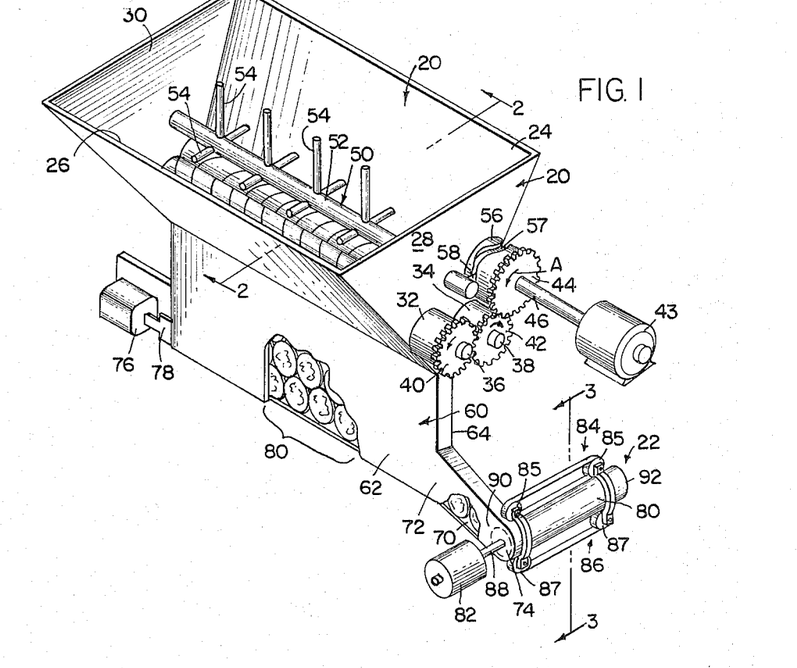
FIG. 1 is a perspective view of a coin feeder and stacker constructed in accordance with this invention and suitable for use with a wide variety of coin handling equipment requiring coins to be fed to them either in a preselected orientation or in selected numbers.
Figure 2:
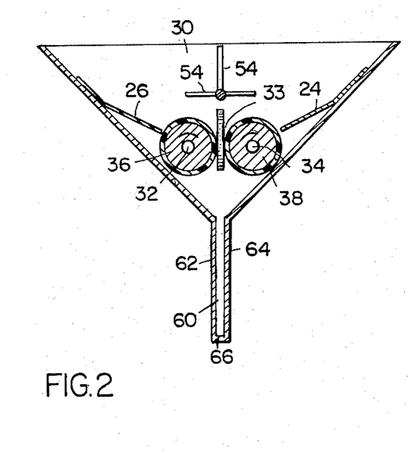
FIG. 2 and 3 are cross sectional views taken along the corresponding section lines in FIG. 1.
Figure 3:
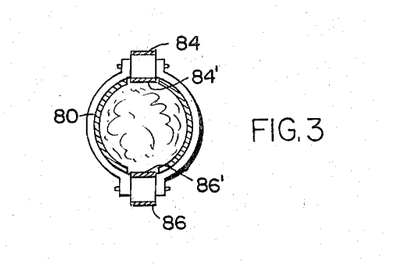

COIN FEEDER AND STACKER (FIGS. 1-3)

The embodiment of this assembly shown in the drawing includes a coin receiving bin 20 and a coin ejector 22 that respectively receive coins in bulk and deliver them in stacks at a desired location. The coin bin 20 is provided with a pair of inclined side walls 24 and 26 connected at their ends by end walls 28 and 30. The lower ends of the inner surfaces of the side walls 24 and 26 terminate at the periphery of a pair of spaced rollers 32 and 34 which extend across the entire length of the bin (see FIG. 2). Thus, all coins dumped into the bin 20 must pass between the rollers 32 and 34 through the gap 33 to move on to other parts of the subassembly.

The rollers 32 and 34 are mounted on shafts 36 and 38, respectively which in turn carry gears 40 and 42 at one end outside wall 28. The two gears 40 and 42 register with one another, and gear 42 is directly driven by gear 44 in turn mounted on a shaft 46 which may be driven directly by a motor 43. The gear 44 is driven in the direction of arrow A causing rollers 32 and 34 to turn counterclockwise and clockwise respectively, as viewed in FIG. 2, so that their adjacent surfaces effectively move upwardly at the sides of the gap between them in the direction opposite to that of coins passing from the bin 20 to the equipment beneath.

A spreader 50 having a shaft 52 and a plurality of radial spokes 54 is designed to move axially back and forth within the bin to spread the coins in the bin evenly over the full length of the rollers. The axial oscillatory motion of the spreader is achieved by the cam 56 and cam follower 58 connected respectively to the gear 44 and shaft 52. The cam track 57 of the cam 56 is sinusoidal in shape and causes the cam follower 58 to move back and forth and carry shaft 52 with it. Thus, the radial spokes of the spreader 50 agitate the coins in the bin and prevent them from overloading one part of the bin while another part is idle.

Disposed beneath the bin 20 and rollers 32 and 34 and extending their full length is a vertically oriented coin chamber 60 having closely spaced side walls 62 and 64 and a bottom wall 66. The chamber 60 is not wide enough to hold two coins in face to face relationship but rather can hold but a single layer of coins as illustrated in FIG. 1. Thus, coins which fall into the chamber 60 are oriented in a vertical plane and stack in rows one upon the other with the coins in edge to edge contact.

A coin passage 70 extends from one end of the chamber 60 to the coin ejector mechanism 22. The coin passage 70 is capable of receiving but a single row of coins as opposed to the many rows as in the chamber 60. The passage 70 may be slightly inclined with respect to the lower wall 66 of the chamber 60 so that coins reaching the inlet end 72 of the passage roll down toward the end 74 forming part of the ejector. While the coins may roll down the passage 70 from the chamber 60, a solenoid 76 is mounted adjacent the other end of the chamber 60 and carries a pusher rod 78 which extends into the chamber. When the solenoid 76 is energized, the rod 78 moves to the right as viewed in FIG. 1 and pushes the lowermost row of coins 80 to the right and toward the slot 70.

Coins which reach the end 74 of the slot 70 are moved into coin stacking cylinder 80 by means of another solenoid 82, and once in the cylinder the coins are held erect by the belt and pulley assemblies 84 and 86 disposed above and below the cylinder, respectively. The solenoid 82 carries a plunger 88 which extends through the wall 90 of the passage 70 and is adapted to engage each coin as it reaches the end 74 of the passage in alignment with the cylinder 80. The plunger 88 pushes each coin into the cylinder 80 and toward its discharge end 92.

In FIGS. 1 and 3 it will be noted that the pair of belts and pulleys 84 and 86 disposed above and below the cylinder actually extend through the cylinder wall along one run of each belt, and those runs of the belts engage the edges of the coins to stabilize them as they move along the cylinder under the influence of the plunger 88. It will be noted in FIG. 3 particularly that the lower run 84' of belt 84 and the upper run 86' of belt 86 lie within the wall of the cylinder 80 and are positioned to engage the upper and lower portions of the periphery of a coin as it moves along the cylinder. By properly loading the pulleys 85 and 87 which carry the belts 84 and 86, respectively, the belts may most effectively perform their intended function.

FIGS. 1 and 3 also reveal that the belts 84 and 86 may perform yet another function; namely, move an entire roll of coins disposed in the cylinder out the discharge end 92. This may be achieved merely by providing drive means for the respective pulleys which support the belts.

In operation the embodiment of FIGS. 1-3 functions as follows: Coins of a single denomination are dumped in bulk into the bin 20 and the motor 43 driving shaft 46 is energized. Energization of the motor causes the gear 44 to rotate which in turn causes the spreader 50 to oscillate back and forth in the bin to spread the coins out over the entire length of the rollers 32 and 34. The agitation imparted to the coins by the spreader will cause the coins disposed in the bottom of the bin to align themselves with the gap 33 between the rollers 32 and 34 which are rotating in the direction of the arrows shown in FIG. 2. The coins thus drop between the rollers in a single plane and stack up in the housing 60 beneath the bin. The solenoid 76 is intermittently energized to push the coins in the bottom of the housing 60 to the right into the passage 70, and the operation of the solenoid 76 is keyed to the operation of the solenoid 82. As each coin reaches the end 74 of the passage 70 the solenoid 82 kicks the plunger rearwardly as viewed in FIG. 1 to remove the coin from the end 74 and transfer it into the cylinder 80. The belts 84 and 86 may move slightly as the coins in the cylinder move with each additional coin introduced by the plunger to provide continuous contact with all the coins between them. It will of course be recognized that energization of solenoid 76 occurs only after the plunger 88 of solenoid 86 is withdrawn so that it does not interfere with movement of the coins down the passage 70 to its end 74.

Figure 4:
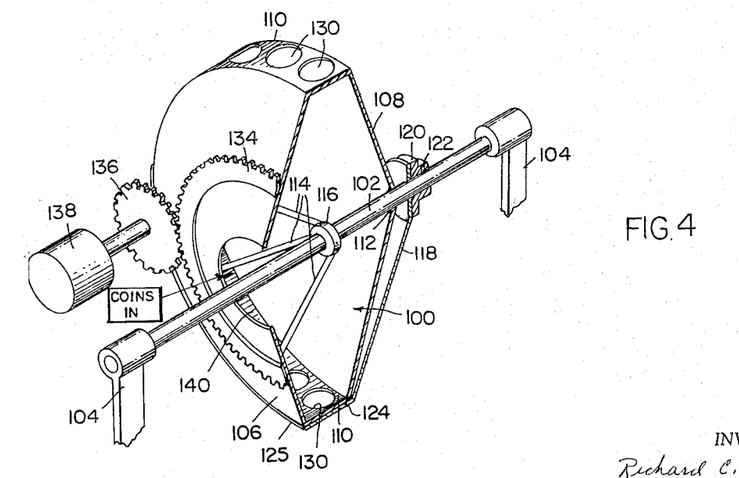
FIG. 4 is a fragmentary perspective view of another embodiment of coin feeder and stacker constructed in accordance with this invention.
Figure 5:
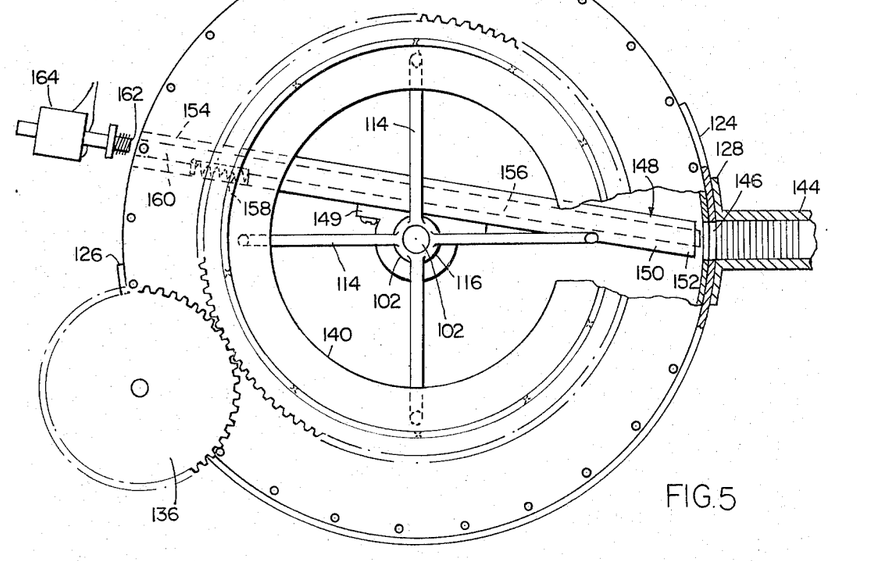
FIG. 5 is a side view partly in section of the device shown in FIG. 4.
Figure 6:
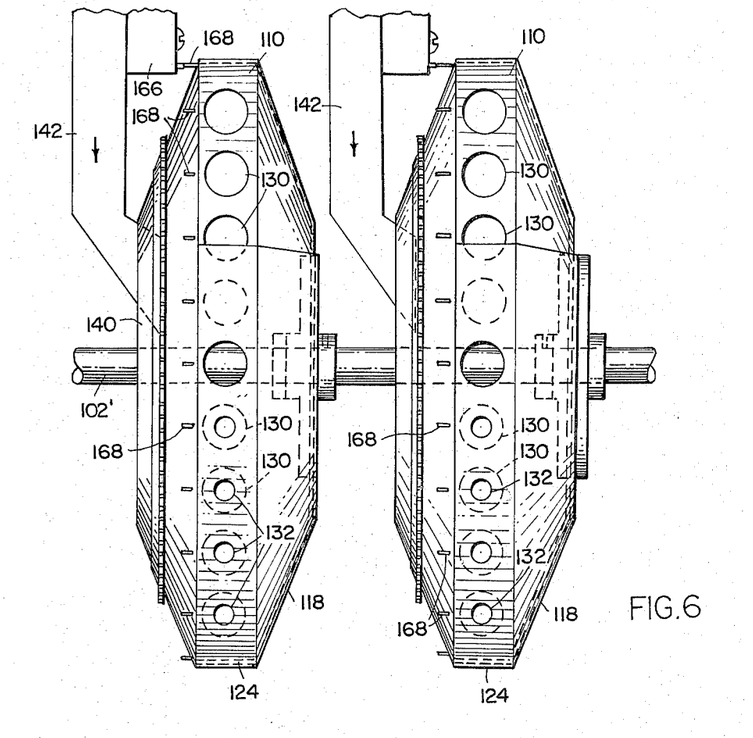
FIG. 6 is a front view of a pair of feeders and stackers suggesting one manner in which they may be used.

COIN FEEDER AND STACKER (FIGS. 4-6)

The feeder and stacker shown in FIGS. 4-6 includes a drum 100 mounted for rotation on a fixed shaft 102 in turn supported on vertical frame members 104. The drum 100 has generally conical-shaped side walls 106 and 108 and cylindrical peripheral wall 110. In FIG. 4 it will be noted that the wall 108 carries bearings 112 at its apex which support the drum 100 for rotation on the fixed shaft 102. A web 114 having a bearing carrying collar 116 supports the other wall 106 for rotation relative to the shaft.

A dish-shaped wall 118 is fixed to the shaft 102 adjacent the wall 108. The wall 118 carries a collar 120 at its center, which is keyed to the shaft by a set screw 122. Thus, while the drum 100 is mounted for rotation on the shaft 102, the wall 118 is fixed to it. The dish-shaped wall 118 carries at its periphery just beyond the cylindrical wall 110 of the drum 100 a curved wall 124 extending through an arc of somewhat more than 180°. In FIG. 5 the ends of the arcuate wall 124 are identified at 126 and 128.

The cylindrical peripheral wall 110 of the drum 100 is provided with closely spaced openings 130 which are just large enough to receive a coin of the denomination being handled by the equipment. The openings 130 extend completely around the peripheral wall 110 of the drum so that as the drum rotates, openings located at the bottom of the drum may continuously accept single coins. The coins are prevented from falling through the openings 130 by the arcuate wall 124 attached to the dish-shaped wall 118 as the walls 124 and 110 are in sliding engagement with one another. Thus, the walls are so close together that coins cannot fall through the openings 130 onto the wall 124 and then off the side edge 125 of the wall.

Small openings 132 are formed over the wall 124 and these openings are too small to pass coins. Rather, they permit grit and dirt which may collect in the inner drum and which passes through the openings 130 to pass out those openings and escape from the assembly.

In FIGS. 4 and 5 the wall 106 of the drum 100 is shown to carry a ring gear 134 which in turn registers with a driven gear 136 carried on the shaft of motor 138. Thus, through the motor 138 rotation is imparted to the drum 100.

Coins are introduced into the drum 100 through the circular opening 140 formed at the center of the wall 106 about the shaft 102. A coin hopper 142 is disposed adjacent the wall 106 and terminates at the opening 140 to introduce coins into the drum. For purposes of clarity the hopper is omitted in FIGS. 4 and 5 but is shown in FIG. 6.

A coin ejecting cylinder 144 is secured to the arcuate wall 124 and has an internal diameter just exceeding the diameter of coins of the denomination to be handled by the equipment. An opening 146 of the same diameter is formed in the arcuate wall 124 and is aligned with the cylinder. Thus, coins picked up in the openings 130 in the peripheral wall 110 of the drum may be discharged into the cylinder 144 when the openings 130 align with the single opening 146 in the wall 124. As each opening 130 passes before the opening 146 means may be provided to transfer the coins into the cylinder 144. Such a mechanism is clearly illustrated in FIG. 5. In FIG. 5 it will be noted that the mechanism 148 includes a sleeve 150 mounted on the shaft 102 by a collar 149, and one end 152 of the sleeve is aligned with the opening 146. The other end 154 of the sleeve 150 lies approximately 180° away from the opening 146 adjacent the wall 110 of the drum 100. The sleeve 150 is so oriented that when one opening 130 is aligned with the end 152 of the sleeve the other end 154 is also aligned with an opening 130 in the wall 110.

The sleeve 150 carries a push rod 156 biased by means of spring 158 to the position shown in FIG. 5 wherein its ends are aligned with the ends of the sleeve inwardly of the openings 130 on each side. The end 160 of the push rod is aligned with the plunger 162 of a solenoid 164 disposed outside the drum.

The plunger 162 of the solenoid is adapted to move the push rod 156 against the bias of spring 158 to the right as viewed in FIG. 5 and eject into the cylinder 144 any coin in an opening 130 aligned with the opening 146.

Energization of the solenoid 164 is timed with rotation of the drum 100 by means of a microswitch 166 and the actuating fingers 168 shown in FIG. 6. The fingers 168 are adapted to trip the microswitch 166 as each opening 130 in the wall 110 aligns itself with the opening 146 on the arcuate wall 124. It will of course be appreciated that each time an opening 130 so aligns itself with the opening 146, that same opening is aligned with the end 152 of the sleeve 150 and another opening 130 opposite the plunger 162 is aligned with the end 154 of the sleeve. Thus, actuation of the microswitch which lies in the solenoid energizing circuit (not shown) causes the plunger to move the push rod against the bias of spring 158 and eject the coin disposed in the opening 130 adjacent the slot 146 into the sleeve 144.

From the foregoing description it will be recognized that coins may be fed in bulk into the drum 100 through the hopper 142. Rotation of the drum 100 causes coins disposed in the bottom of the drum to fall into the openings 130 in the peripheral wall 110, and as the drum rotates under the influence of motor 138 the coins are presented one at a time in front of the opening 146 in the arcuate wall 124. As each coin presents itself in this location one of the fingers 168 trips the microswitch 166 to energize the solenoid 164 and cause it in turn to move the push rod 156 toward the cylinder 144 and convey the coin in the slot 130 into the cylinder. This action may be conducted on a continuous basis and coins may in turn be removed from the cylinder 144 in preselected numbers to form rolls of coins of a selected value. In FIG. 6 a pair of units are mounted on the shaft 102' and in ordinary use each unit will handle coins of one denomination. Obviously five such units each tailored with openings etc. of the right size could sort all denominations of coins.

Figures 7, 8, 9:
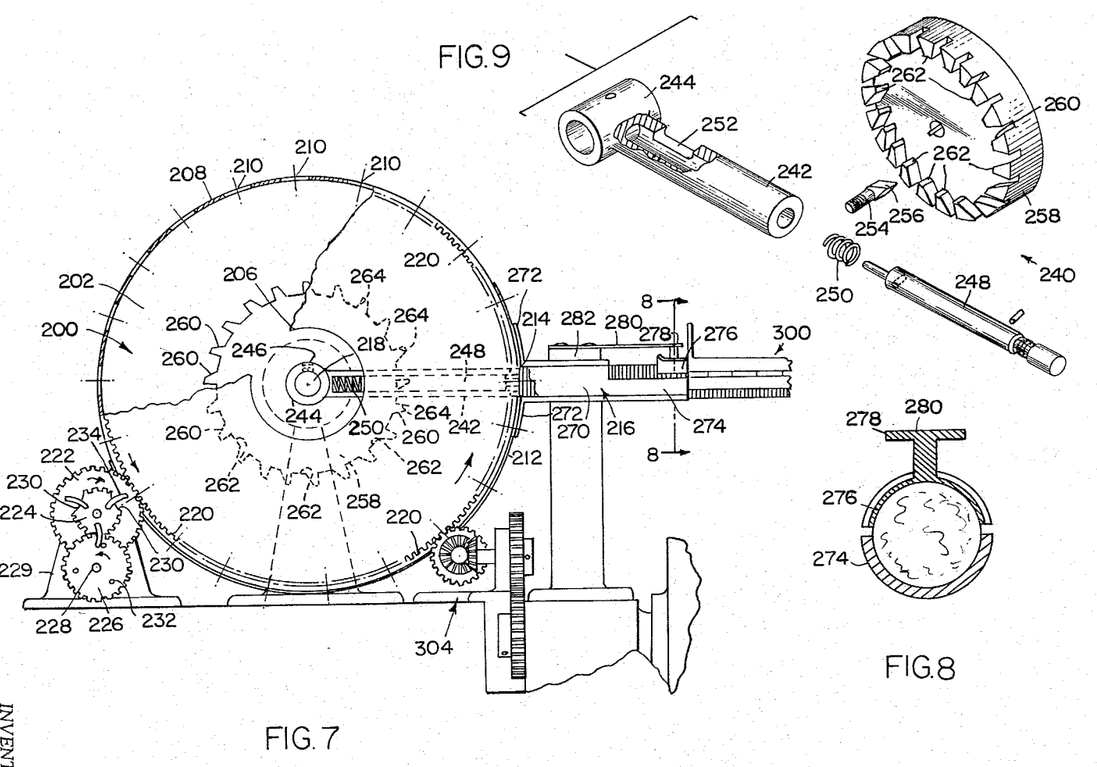
FIG. 7 is a side view, partly in section, of another embodiment of coin feeder and stacker constructed in accordance with this invention.
FIG. 8 is a cross-sectional view taken along the section line 8—8 of FIG. 7.
FIG. 9 is an exploded view of the coin ejecting mechanism forming part of the embodiment of FIG. 7.

COIN FEEDER AND STACKER (FIGS. 7–9)

The coin feeder and stacker shown in FIG. 7 is very similar to that shown in FIGS. 4–6 but includes a different form of coin ejecting mechanism. Thus, the fragmentary perspective view of FIG. 4 shows an inner drum and a dished shaped wall with a surrounding arcuate wall at the periphery of the drum substantially identical to that of the present embodiment. In this embodiment a drum 200 substantially the same as drum 100 in the previous embodiment includes a pair of side walls (one shown in the side view of FIG. 7 at 202) with the wall 202 provided with a central opening 206 through which coins may be fed in bulk to the interior of the drum. A cylindrical peripheral wall 208 is provided with openings 210 each sized to receive one coin of the denomination being handled by the equipment. An arcuate wall 212 surrounds a portion of the wall 210 of the drum in the manner of wall 124 in the previous embodiment and the wall 212 is provided with one opening 214 adapted to receive coins from the openings 210 and permit them to enter the coin rack 216. The drum 200 is mounted for rotation on a nonrotating shaft 218 which also supports the fixed arcuate wall 212.

As shown in FIG. 7, the drum is rotated by means of a ring gear 220 secured to the side wall 202 which in turn registers with a gear 222. Rotation is imparted to the gear 222 through its smaller gear 224 and motor driven gear 226. In FIG. 7 gear 226 is shown to be mounted on the shaft 228 of motor 229. The gear 224 and 226 do not carry uniformly spaced teeth but rather each is provided with several null points 230 which cause rotation of the inner drum 200 momentarily to stop. Rotation ceases when the null points on the two gears 224 and 226 mate with one another, and rotation is again imparted to the drum 200 when a pin 232 engages a fin 234 carried by the gear 224. The pins push the fins to in turn move the gear 224 so that the teeth of the gears 224 and 226 again engage one another, and rotation continues until the null points 230 once again register.

The idling of the drum 200 is arranged to occur each time an opening 210 in the peripheral wall of the drum is aligned with the opening 214 in the arcuate wall surrounding the drum. During the interval when rotation of the drum ceases the ejecting mechanism removes the coin in that opening 210.

The ejecting mechanism 240 is shown in detail in FIGS. 7 and 9. The mechanism 240 includes a sleeve 242 provided with a collar 244 at one end supported on the shafts 218 and fixed against rotation of the shaft by one or more set screws 246. The sleeve 242 is aligned with the opening 214 in the arcuate wall 212 and contains a plunger 248 biased by means of spring 250 to the position shown in FIG. 7 wherein the rod 248 extends through one opening 210 in the peripheral wall 208 of the drum and the opening 214 in the arcuate wall. Thus, the spring 250 biases the push rod 248 to a position where that push rod will eject a coin disposed in the slot 210 aligned with the opening 214 in the arcuate wall to move that coin onto the rack 216.

The sleeve 242 has an elongated slot 252 formed in its side through which a pin 254 carried on the rod 248 extends. The pin 254 on its outer end in turn carries a cam follower 256 which cooperates with the gear-shaped cam 258 supported for rotation with the drum 200 by any convenient means such as a spider.

The gear-type cam 258 which rotates with the drum 200 includes inclined cam surfaces 260 which act upon the cam follower 256 to draw the plunger 248 into the sleeve 242 against the action of the spring 250. The plunger 248 remains in the sleeve 240 as the follower 256 passes along the circumferential surface 262 of the cam 258. However, when the follower 256 reaches the radial wall 264 it drops off the surface 262 and releases the plunger 248 to the action of the spring. The spring then moves the rod to the position shown in FIG. 7 wherein it removes the coins in the openings 210 and drives them into the coin rack 216.

The rack 216 is shown to include a sleeve 270 provided with flanges 272 secured to the exterior face of the arcuate wall 212. The flanges 272 are secured to the wall 212 with the axis of the sleeve 270 aligned with the axis of the opening 214, and the diameter of the cylinder 270 is substantially identical to the diameter of the opening 214.

The bottom half of the cylinder 270 extends beyond the cylinder proper to form a U-shaped section 274 which exposes the upper half of the coins in the rack. The coins in the rack which pass beyond the cylinder to the open portion are supported by an inverted U-shaped plate 276 carried on the end 278 of spring arm 280. The spring arm 280 is supported on the upper end of a post 282 and is so loaded that the plates 276 bears firmly against the upper portions of the coins disposed in the section 274 to steady them and to prevent them from falling over. In FIG. 8 the manner in which the plate 276 cooperates with the trough 274 to retain the coins in a vertical plane is clearly shown.

The device shown in FIGS. 7–9 operates in substantially the same manner as the embodiment of this invention shown in FIGS. 4–6. Thus, coins are fed into the drum 200 through the opening 206 in the side wall 202, and the coins in bulk in the drum 200 are picked up singly by the coin-size openings 210 in the drum wall 208. As each opening 210 aligns itself with the opening 214, rotation of the drum is momentarily stopped by a null section 230 of the gear 224. Just as rotation of the drum 200 stops the cam follower 256 will fall off the circumferential wall 262 of the cam by reason of the radial wall 264, and the plunger 248 under the influence of spring 250 will eject the coin in the slot 210 aligned with the opening 214 and drive it onto the rack 216. Continued rotation of the motor 229 will turn the gear 226 in the direction of the arrow shown in FIG. 7, and a pin 232 will pick up the fin 234 to once again impart rotation to the drum. As rotation is imparted to the drum the inclined surface 260 of the cam 258 will force the cam follower 256 radially inwardly and move the plunger 248 in the same direction against the action of spring 250. When the next opening 210 aligns itself with the opening 214 the follower 256 will again fall off the circumferential surface of the cam and eject the next coin presented. The coins will stack up in the rack 216 and be prevented from tipping by the action of the spring 280 and the inverted U-shaped plate 276 on the coins in section 274.

The coins may pass from the rack 216 to the coin loader 300 which forms part of the wrapping machine described below under the appropriate subheading. In FIG. 7 the wrapping machine is broken away, but its drive is shown to be furnished by the ring gear 220 acting through the gear train 304.

COIN WRAPPING MACHINE (FIGS. 10–14)

Figure 10:
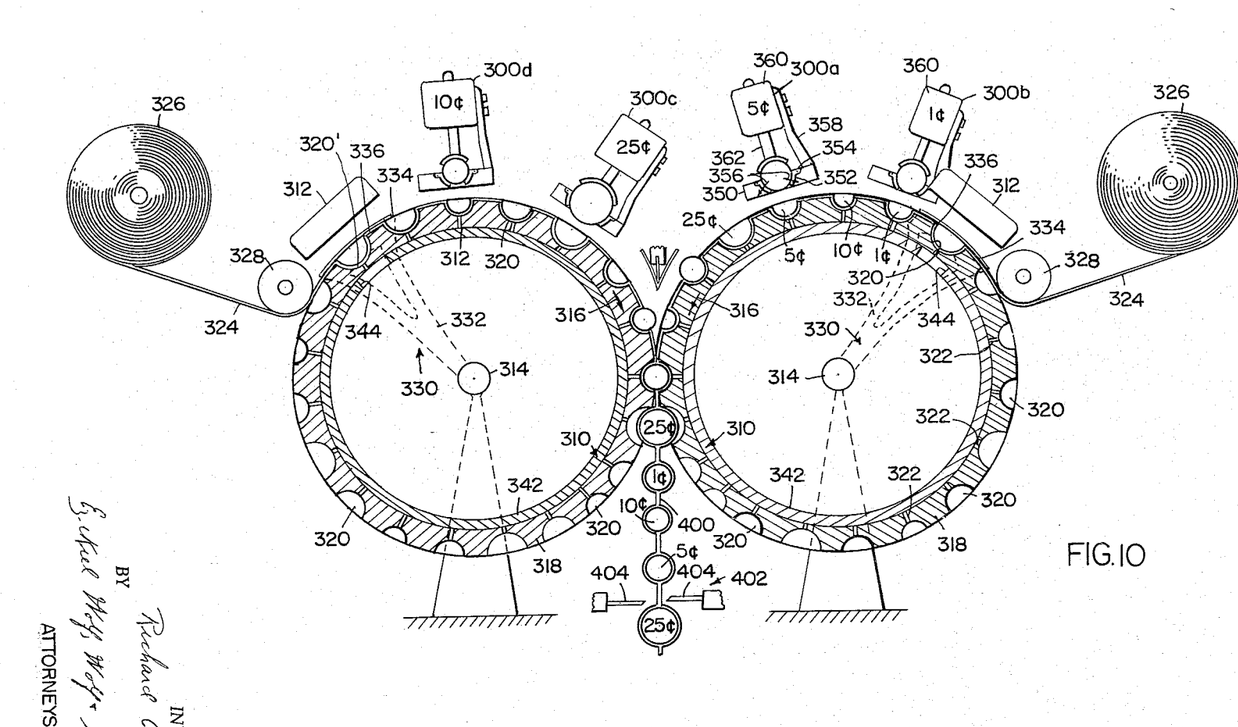
FIG. 10 is a diagrammatic view showing a coin wrapper constructed in accordance with this invention.

The assembly shown in FIG. 10 includes a pair of vacuum forming drums 310, four coin loaders 300a–300d, and two heaters 312, one used in connection with each of the drums 310. These components are described in detail below.

Figure 12:
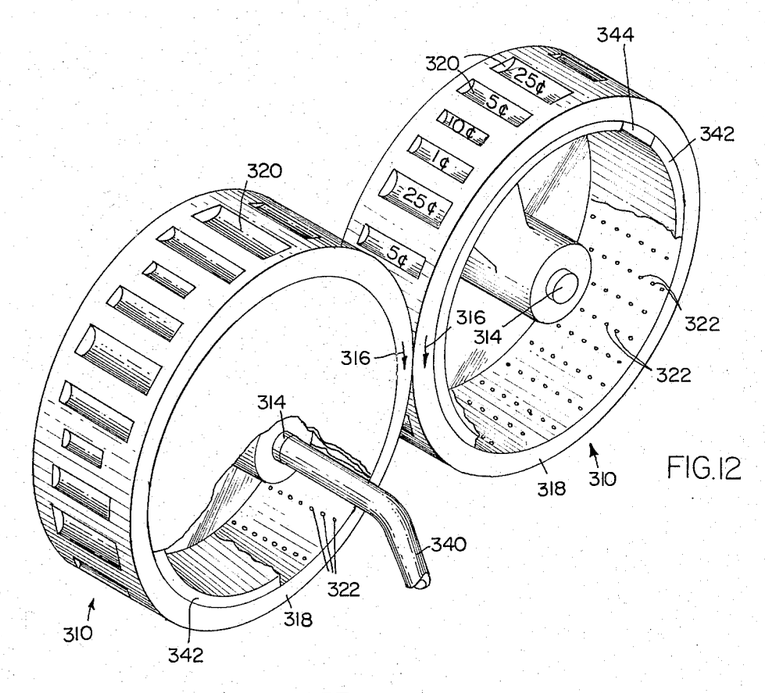
FIG. 12 is a perspective view of a portion of the machine shown in FIG. 10.

The drums 310 are mounted on a pair of parallel shafts 314 for rotation in the direction of the arrows 316 shown in FIGS. 10 and 12. Each of the drums has a cylindrical wall 318 about which are arranged a number of parallel troughs 320 each of which is in communication with the interior of its drum through the perforations suggested at 322 in FIG. 12. The troughs 320 are semi-cylindrical and thus when a trough in one drum is aligned with a trough in the other drum they form a full cylinder.

Figure 15:
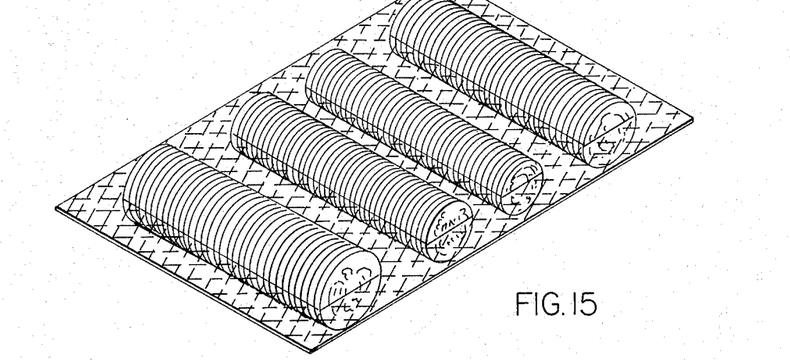
FIG. 15 is a perspective view of a coin package made by the assembly shown in FIGS. 10-14.

The troughs 320 in the cylindrical walls 318 cooperate with one another to form the wrapper about rolls of coins deposited in them. In FIG. 10 the manner in which the wrapper is formed is suggested. It will be noted that a plastic sheet 324 is fed continuously to each drum from a roll 326 about an idler roller 328, and the sheets extend about the cylindrical walls of the drums until they come together where the drums meet tangentially. The plastic sheets 324 are heated by the respective stationary heaters 312 adjacent the roller 328 and are vacuum drawn into the troughs by a vacuum applied to the interior of the drums. Subsequentlly different denominations of coins are deposited in the different troughs and the two sheets are then sealed together about the rolls of coins. After the sheets pass beyond the point where the rolls meet tangentially, the packages are severed from the continuous sheet and appear as shown in FIG. 15.

Figure 11:
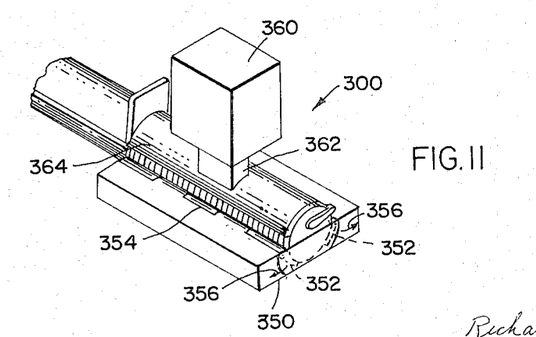
FIG. 11 is a detailed perspective view of a coin loader forming part of the machine shown in FIG. 10.

As is evident in FIG. 11 the plastic sheets are threaded from the rolls 326 under the idle rollers 328 and then about the periphery of the drums. In the drawings it will be noted that a stationary shield 330 is supported on each of the shafts 314. Each shield includes radially extending legs 332, one on each side of the drum, and a plate 334 which extends across the cylindrical wall of the drum from one leg to the other. The wall 334 shields the plastic sheet from the heater 312 and exposes only a small segment of it. In FIG. 10 it will be noted that the wall 334 is provided with an opening 336 which exposes an area of the sheet of plastic just exceeding the size of one trough 320 so that only that portion of the sheet which overlies one such trough may be heated to a yieldable temperature by the heaters 312. As each drum 310 rotates in the direction of arrow 316 its plastic sheet is pulled with the drum periphery, and each time a trough 320 is aligned with the opening 336 in the shield 330 the heater 312 is energized to render the plastic over the trough yieldable so that it may be vacuum drawn to conform to the shape of the trough.

As indicated above each of the drums 310 is hollow and openings 322 are provided through the cylindrical wall 318 of the drum to communicate between the troughs 320 and the drum interiors. The openings 322 permit a vacuum to be applied to the troughs to draw the plastic sheet into them and thus provide the sheets with the contours of the troughs in the cylindrical walls 318. A vacuum line 340 is connected axially to each of the drums 310 and the vacuum line is connected to some form of vacuum pump (not shown) so as to markedly reduce the pressure in the drums to draw the sheets into the troughs.

As indicated heat is applied only intermittently to each plastic sheet and at but one location as determined by the shields 330. Thus, while the drums 310 are evacuated, for maximum efficiency as well as to avoid any harmful effect upon the unheated portions of the plastic sheet the vacuum is applied only to the trough 320 in the cylindrical surface 318 of the drum which is aligned with the opening 336 in the shield. A fixed cylindrical wall 342 disposed within each of the drums serves as a valve to maintain all of the openings 322 closed except those which communicate with the particular trough exposed through the opening 336 in the shield. In FIGS. 10 and 12 it will be noted that the cylindrical wall 342 has a slot 344 within the region of the shield 330, and that slot exposes the openings 322 communicating with trough 320' exposed within the opening 336 in the shield. This same arrangement is shown in each of the two drums 310 of the assembly. Thus, with continued movement of the drums the sheets maintain their integrity as a continuous web member until severed after the coin package is completely formed. As a result it will be seen in FIG. 10 that the plastic sheet about each drum follows the contour of each trough in the periphery over the arc of the drum covered by the sheet.

After the sheet has been formed to comply with the contours of the cylindrical walls 318 of the drums, coins may be deposited in the respective troughs in the selected denominations. In FIGS. 10 and 12 it is evident that the troughs are not all of the same size but rather are of different lengths and diameters to receive rolls of different denominations of coins. Thus, the trough sized for quarters may receive a stack of forty quarters, the troughs sized for nickels may each hold a roll of forty nickels, the troughs sized to receive dimes will hold fifty dimes, and the troughs for receiving pennies will hold fifty pennies.

The coin loaders 300 are provided to deposit the coins in the different troughs after they have been lined with the plastic sheet material. In FIG. 10 it will be noted that loader 300a is shown disposed above a trough intended to receive a roll of nickels and a second loader 300b is disposed above the same drum and is adapted to deposit pennies in the troughs sized to receive a roll of pennies. Disposed above the other drum 310 are two other loaders 300c and 300d which are respectively provided to deposit rolls of quarters and dimes into the appropriate troughs in that other roller. The loaders in turn are adapted to receive coins from coin feeding machines of the variety shown in FIGS. 1–3, 4–6 and 7–9. In FIG. 7 one loader 300 is actually shown disposed adjacent the end of the rack 216 to receive a roll of coins. It will also be noted in that figure that a part of one drum 310 is shown disposed beneath that loader.

The loaders include a base plate 350 which supports a pair of spring loaded fins 352 biased to the position shown in FIG. 11. The fins 352 are pivotally supported on the hinge members 354 and each may move in the direction of arrows 356 to permit a roll of coins supported on the fins to drop between them. The base plate 350 supports a frame 358 which in turn carries a solenoid 360 having a downwardly extending plunger 362 which carries a curved plate 364 adapted to engage the top of a stack of coins supported on the fins 352. This arrangement is fully shown in FIG. 11. In that figure the loader 300 is shown to contain a stack of coins supported on the fins 352 and effectively steadied by the curved plate 364. When the solenoid 360 is energized the plunger 362 is driven downwardly and the plate 364 in contact with the tops of the coins in the stack forces the roll downwardly by spreading the fins 352, and the roll is thereby deposited in the trough disposed beneath it. After the coins pass between the fins 352 they are released to the influence of their biasing means which return them to the position shown in the drawing. De-energization of the solenoid 360 causes the plunger 362 to elevate and raise the plate 364 to enable additional coins to be deposited into the loader.

Figure 13:
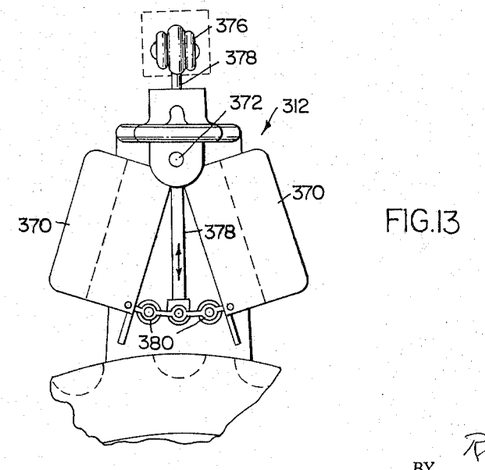
FIG. 13 is an end view of a heater forming a part of the machine shown in FIG. 10.

The heaters 312 as described above direct heat to the plastic sheets to make them formable when subjected to the vacuum. It is essential that the heaters direct heat to the plastic sheet only at particular periods and only at specific locations. If the heaters were continuously active they would apply heat not only to the portions of the sheet which overly the troughs, but to the portions of the sheet which extend between the troughs on the surface of the walls 318. If this were permitted the sheets would lose their integrity and the packages would not hold together. That is, it would be impossible to produce a package containing a plurality of rolls of coins such as shown in FIG. 15 if the portions of the sheet lying between the troughs containing the coins were subjected to the heat of the heaters. To control the effective operating periods of the heater 312 the heating elements of the heater are contained in a pair of covers 370 hinged together at their top as suggested at 372 in FIG. 13. Disposed within each of the covers 370 are heating coils 374 (see FIG. 14), and when the coils are energized and the covers are spread as shown in FIG. 13 the heating coils will direct heat to the plastic sheet. However, when the covers 370 are closed they serve as insulators to prevent the heat generated by the coils from reaching the sheet. It is necessary to employ some form of insulated container to effectively start and stop operation of the heaters as the coils 374 cannot heat up and cool at a speed sufficient to keep pace with the speed of rotation of the drums and the movement of the sheet.

Figure 14:
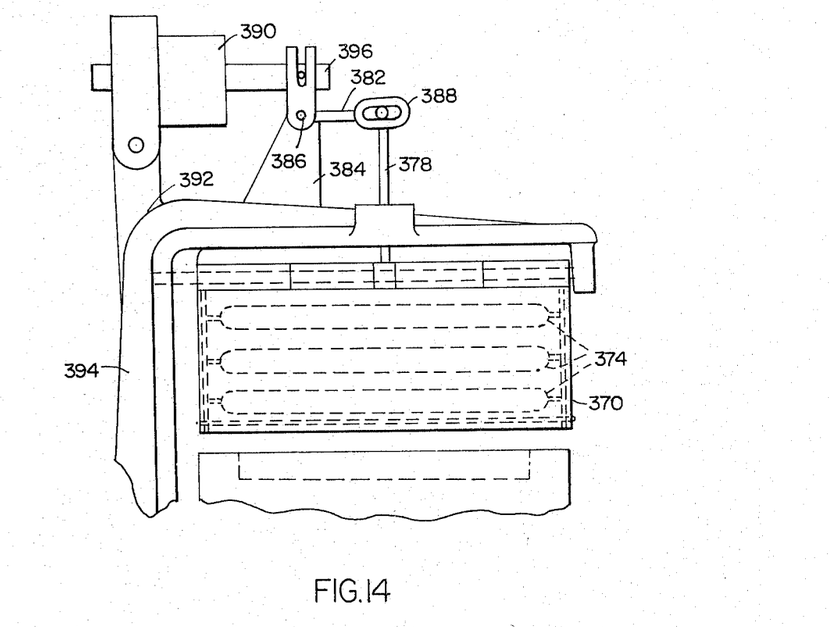
FIG. 14 is an inside view of the heater shown in FIG. 13.

A linkage system 376 is shown in FIGS. 13 and 14 for opening and closing the covers 370. The linkage system includes a push rod 378 which when drawn upwardly closes the covers 370 and when pushed downwardly opens them. The lower end of the push rod 378 is connected by links 380 to the lower ends of the covers 370, and the upper end of the push rod 378 is connected to pivotally mounted actuator 382 supported on the fulcrum 384 by pin 386. A pin and slot connection 388 joins the end of the actuator 382 and the rod 378. When the actuator is pivoted counter clockwise as viewed in FIG. 14 the rod 378 is elevated to close the covers 370. A solenoid 390 is mounted on an ear 392 of frame member 394, and the solenoid stem 396 is keyed to the actuator 382. Energization of the solenoid 390 draws the plunger 396 to the left as viewed in FIG. 14, which causes the actuator 382 to pivot counter clockwise about its support 386 to close the heater covers 370. De-energization of the solenoid 390 causes the connecting rod 378 to move downwardly and force the covers 370 open to expose the heaters so that the heat dissipated by them may be directed to the exposed portion of the plastic sheet lying within the confines of the opening 336 in the shield 330.

The embodiment of the wrapper shown in FIGS. 11–14 operates as follows to form the package shown in FIG. 15. The two rolls of plastic sheet material are threaded about the idle rollers 328 and over the periphery of the drums 310 and under the shields 330. The two sheets may be provided with a coating of adhesive on their upper surfaces while coatings become active upon the application of heat from the heaters 312 or is pressure sensitive. In either case, when the two sheets come together in face to face relationship between the rollers where the rollers meet tangentially, they adhere together to form the package. The motors operating the drums 310 and the coin stacking units which in turn direct coins to the loaders 300a, 300b, 300c and 300d are energized.

It is assumed that the timing circuits which form no part of the present invention are operative so that various parts are actuated at the appropriate times. The drums 310 rotate in the direction of arrows 316 in a stepped movement; that is, each time a trough 320 is exposed through the openings 336 in the shields 330 the drums momentarily stop at which time the heater covers 370 open allowing the heating elements to elevate the temperature of the plastic sheets exposed through the openings. The temperatures of the portions of the sheets exposed through the openings is quickly elevated and the vacuum pump (not shown) is energized to evacuate the interior of the drums and draw the plastic sheets into the troughs beneath the heated portions of the sheets. Thereafter the heater covers 370 of each heater 312 close and the drums turn again until the next trough of each drum is exposed beneath the opening in its shield.

Simultaneously with the formation of the troughs in the sheets, coin stacks are deposited in previously formed troughs which have moved beyond the heaters 312 to the loaders 300. Thus, as a trough sized to receive a roll of pennies reaches the point below coin loader 300b a roll of pennies is discharged into the trough when the drum is momentarily stopped. Similarly when a trough to receive nickels is temporarily stationed beneath the loader 300a, and when a trough to receive quarters is temporarily stationed beneath the loader 300c, and when a trough to receive dimes is temporarily disposed beneath the loader 300d the respective loaders operate to discharge their coin rolls into those troughs. As the drums continue to rotate in the direction of arrows 316 the sheets are brought together where the drums meet tangentially and will form an enclosure about the coins previously deposited in the troughs. Thus, as the drum 310 on the right side as viewed in FIG. 10 turns counter clockwise in the direction of its arrow 316 the troughs containing the pennies and nickels will ultimately come into alignment with the like troughs formed in the other drum but which troughs are empty except for the lining of the plastic sheet. Similarly, the troughs in the left drum sized to contain the dimes and quarters will be filled and thereafter come into alignment with the empty troughs on the drum on the right, which are identical in size. Thus, the unfilled troughs in each sheet serve to form a cover for the filled troughs in the other sheet and in this manner the two sheets form a package about all of the coins. The adhesive coatings on the sheets will serve to hold them together. If a pattern is to be impressed on the package as suggested in FIG. 15, the surfaces of the walls 318 of the drums about the troughs may be provided with a special texture to achieve the desired design. In FIG. 10 it will be noted that a continuous web 400 is discharged beneath the point of tangential meeting of the drums 310, which web is in fact a continuous strip of coin packages of the variety shown in FIG. 15. A knife 402 is disposed beneath the drum 310 and its cutting blades 404 may be intermittently actuated after a selected number of rolls of coins have passed between them. Thus, if it is intended to form multi-roll packages of the type shown in FIG. 15, after each series composed of quarters, nickels, dimes and pennies passes the knife, the blades are actuated. In a like manner the knife may be actuated after each roll passes between the cutting blades to form individual rolls of coins of different denominations.

In the foregoing description I have described in detail several coin feeding and stacking devices, each of which may be used in combination with the wrapping device also illustrated and described specifically. Moreover, each of the devices has application with other forms of equipment.

Those skilled in the art will appreciate after reading the foregoing description that many modifications may be made of each device. Because such modifications are within the skill of those familiar with the art and do not constitute inventive departures from the described devices, it is not intended that the breadth of this invention should be limited to the embodiments illustrated and described. Rather, it is intended that the scope of this invention be determined by the appended claims and their equivalents.

What is claimed is:

1. A coin wrapping machine comprising,
   a pair of axially parallel drums rotatable about their axes and having tangentially meeting outer cylindrical walls,
   semicylindrical cavities provided in each of the cylindical walls and each sized to receive a roll of coins of a selected denomination, the cavities in each cylindrical wall when aligned with like cavities in the other cylindrical wall forming a complete enclosure for rolls of coils placed in them,
   means for applying a thin plastic film to each of the cylindrical walls including the cavities before rolls of coins are placed in them,
   means for stacking coins in preselected positions in rolls, with the axes of said rolls substantially parallel to the axes of said semi-cylindrical cavities,
   means for placing said rolls of coins in selected cavities in each of the cylindrical walls previously covered by the film,
   and means for securing the sheets together as the rolls meet tangentially after the rolls have been placed, whereby a complete package is formed about the rolls in the cavities.

2. A coin wrapping machine comprising,
   a pair of axially parallel drums rotatable about their axes and having tangentially meeting outer cylindrical walls,
   semicylindrical cavities provided in each of the cylindical walls and each sized to receive a roll of coins of a selected denomination, the cavities in each cylindrical wall when aligned with like cavities in the other cylindrical wall forming a complete enclosure for rolls of coils placed in them,
   means for feeding a sheet of plastic material onto each of the cylindrical walls which sheets are taken up by the walls of the drums rotate,
   means for heating the sheets at the portions to be formed into said cavities to a formable temperature and applying a vacuum to the sheets from within the drums only at preselected areas of said sheets so that the sheets are drawn into and line the cavities on the cylindrical walls,
   means for stacking coins in preselected positions in rolls, with the axes of said rolls substantially parallel to the axes of said semi-cylindrical cavities,
   means for depositing said rolls of coins in selected cavities of at least one drum after the cavities have been lined at with the plastic sheets,
   and means for securing the two sheets together about where the drums meet tangentially causing the sheet on one drum to form a cover for the coins in the lined cavities on the wall of the other drum.

3. A coin wrapping machine as defined in claim 2 further characterized by,
   cutting means disposed adjacent the drums and beyond where they meet tangentially to sever selected numbers of rolls of coins wrapped in the sheets to form packages of one or more coin rolls.

4. A coin wrapping machine as defined in claim 2 further characterized by,
   said heating means including a housing containing heating coils,
   means for opening and closing the housing for alternately enabling the coils to heat the sheet.

5. A coin wrapping machine as defined in claim 2 further characterized by,
   a shield carried on each outer surface of the drum and overlying the sheets and limiting the area of the sheets heated by the heating means for each position of the drums.

6. A coin wrapping machine comprising,
   forming means for providing a continuous sheet of material with spaced troughs for receiving coins and conveying the sheet along a prescribed path,
   a coin feeder disposed adjacent the path and including a pair of movable fins for carrying a roll of coins,
   a plate disposed adjacent the fins and adapted to engage a roll of coins carried by the fins,
   and actuating means connected to the plate for driving plate toward the fins and force them to move and pass the roll of coins between them to the troughs on the sheet.

7. In a coin wrapping machine,
   a pair of axially parallel drums each having cylindrical walls which meet tangentially,
   troughs formed in the cylindrical walls of each drum, said troughs being sized to receive rolls of coins,
   shield disposed in a fixed location and overlying the cylindrical walls of the drums,
   an opening in each shield substantially equal in size to the size of the troughs in the cylindrical walls,
   means for rotating each of the drums so that the troughs in each cylindrical wall passes beneath the opening in the drum's shield,
   heaters disposed adjacent the drums and the shields,
   means for directing sheets of material to each of the drums and causing the sheets to travel through a prescribed arc with the rotation of the drums, which arc includes the heater and shield on each end with the sheets passing beneath the shields,
   said heaters directing heat to the sheets when each trough passes beneath the opening in the shield,
   means for drawing the sheets into the troughs when the sheets are heated through the openings,
   a plurality of coin feeders disposed adjacent said heaters with at least one feeder positioned to deposit a roll of coins into the troughs of each drum after said sheets are drawn,
   means operatively connected to each of said feeders for directing rolls of coins into the feeders after the feeders have discharged their rolls into the troughs,
   and means for securing the sheets together after the troughs are formed and with the troughs of each sheet aligned with the troughs of the other sheet.

8. In a coin wrapping machine as defined in claim 7, said means for drawing the sheets including means for applying a vacuum to the interior of each drum,
   and means for placing the troughs in communication with the interiors of the drums as each trough passes beneath the opening in the shield.

9. A coin wrapping machine comprising, a pair of axially parallel drums rotatable about their axes and having tangentially meeting outer cylindrical walls mounted for movement along a prescribed path,
   semicircular cavities provided in each of the cylindrical walls and each sized to receive a roll of coins of a selected denomination, the cavities in each cylindrical wall when aligned with like cavities in the other cylindrical wall forming a complete enclosure for rolls of coins placed in them,
   means for applying a thin plastic film to each of the cylindrical walls including the cavities before rolls of coins are placed in them,
   means for placing rolls of coins in selected cavities into which troughs of the film have been drawn,
   means for securing the sheets together as the rolls meet tangentially after rolls have been placed, whereby a complete package is formed about the rolls in the cavities,
   a coin feeder disposed adjacent the path and including a pair of movable fins for carrying a roll of coins,
   a plate disposed adjacent the fins and adapted to engage a roll of coins carried by the fins, an actuating means connected to the plate for driving the plate toward the fins and forcing them to move and pass the roll of coins between them to the troughs on the sheet.

References Cited by the Examiner

UNITED STATES PATENTS

| | | | |
|---|---|---|---|
| 793,413 | 6/1905 | Broga | 53—212 X |
| 1,234,029 | 7/1917 | Hosking | 133—1 |
| 1,266,099 | 5/1918 | Brandt et al. | 133—1 |
| 2,160,367 | 5/1939 | Maxfield et al. | 53—22 |
| 2,387,747 | 10/1945 | Cowley | 53—140 X |
| 2,490,781 | 12/1949 | Cloud | 53—184 X |
| 2,497,212 | 2/1950 | Donofrio | 53—141 X |
| 2,709,880 | 6/1955 | Jorgensen | 53—254 X |
| 2,917,878 | 12/1959 | Carnarius | 53—22 |
| 2,918,767 | 12/1959 | Grinstead et al. | 53—112 |
| 2,951,324 | 9/1960 | Podlesak et al. | 53—112 |
| 2,958,168 | 11/1960 | Vogt | 53—184 X |

FOREIGN PATENTS 695,284   8/1953   Great Britain.

FRANK E. BAILEY, *Primary Examiner.*

TRAVIS S. McGEHEE, *Examiner.*

A. E. FOURNIER, P. H. POHL, *Assistant Examiners.*